(12) United States Patent
Iwamoto et al.

(10) Patent No.: US 11,493,919 B2
(45) Date of Patent: Nov. 8, 2022

(54) VEHICLE INCLUDING INFORMATION PRESENTATION APPARATUS FOR PRESENTING INFORMATION TO DRIVER

(71) Applicant: Toyota Jidosha Kabushiki Kaisha, Toyota (JP)

(72) Inventors: Takayuki Iwamoto, Shizuoka (JP); Hojung Jung, Susono (JP); Shintaro Shiba, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 177 days.

(21) Appl. No.: 16/725,506

(22) Filed: Dec. 23, 2019

(65) Prior Publication Data
US 2020/0209851 A1 Jul. 2, 2020

(30) Foreign Application Priority Data
Dec. 26, 2018 (JP) .............................. JP2018-242574

(51) Int. Cl.
*G05D 1/00* (2006.01)
*B60W 40/09* (2012.01)

(52) U.S. Cl.
CPC ........... *G05D 1/0061* (2013.01); *B60W 40/09* (2013.01); *G05D 1/0088* (2013.01)

(58) Field of Classification Search
CPC .... G05D 1/0061; G05D 1/0088; B60W 40/09
See application file for complete search history.

(56) References Cited

U.S. PATENT DOCUMENTS

| 2016/0355192 | A1* | 12/2016 | James | B60R 11/04 |
| 2016/0378112 | A1* | 12/2016 | Ljubuncic | G06K 9/00845 |
| | | | | 701/45 |
| 2017/0021837 | A1 | 1/2017 | Ebina | |
| 2017/0261974 | A1* | 9/2017 | Ebe | B60W 50/14 |
| 2020/0073379 | A1* | 3/2020 | Elkins | B60W 50/14 |

FOREIGN PATENT DOCUMENTS

| JP | 2017-211882 A | 11/2017 |
| WO | 2015151243 A1 | 10/2015 |

\* cited by examiner

*Primary Examiner* — Ramsey Refai
(74) *Attorney, Agent, or Firm* — Dinsmore & Shohl LLP

(57) ABSTRACT

An information presentation apparatus includes an activity determination unit configured to determine whether a driver engages in a driving activity or a non-driving activity; an engagement level calculation unit configured to calculate a driver engagement level related to driving, based on at least one of a determination result of the driving activity and a determination result of the non-driving activity in an engagement level calculation period; a system confidence level acquisition unit configured to acquire a system confidence level of autonomous driving control; and an information presentation unit configured to present information to the driver based on the engagement level and the system confidence level.

7 Claims, 11 Drawing Sheets

*Fig.3*

| SYSTEM CONFIDENCE LEVEL | | |
|---|---|---|
| HIGH | MEDIUM | LOW |
| 2.5 | 1.2 | 0.1 |

*Fig.4*

| SYSTEM CONFIDENCE LEVEL | | |
|---|---|---|
| HIGH | MEDIUM | LOW |
| 2 | 5 | 8 |

*Fig.8*

|  | SYSTEM CONFIDENCE LEVEL | | |
| --- | --- | --- | --- |
|  | HIGH | MEDIUM | LOW |
| TYPE OF ACTIVITY — WATCHING MOVIES | 2.5 | 1.2 | 0.1 |
| TYPE OF ACTIVITY — TEXTING | 0.7 | 0.1 | 0.02 |

VEHICLE INCLUDING INFORMATION PRESENTATION APPARATUS FOR PRESENTING INFORMATION TO DRIVER

CROSS-REFERENCE TO RELATED APPLICATION

This application claims the benefit of priority from Japanese Patent Application No. 2018-242574, filed on Dec. 26, 2018, the entire contents of which are incorporated herein by reference.

TECHNICAL FIELD

The present disclosure relates to an information presentation apparatus that presents information to a driver of a vehicle.

BACKGROUND

For example, Patent Literature (International Publication No. 2015/151243) describes an information presentation apparatus that presents, based on how much a driver pays attention to driving, information to the driver of a vehicle capable of switching between autonomous driving and manual driving.

SUMMARY

For example, if the driver switches an activity between a driving activity and a non-driving activity in a short time, even though the total time of the driving activity is greater than or equal to a predetermined time, the apparatus described in Patent Literature (International Publication No. 2015/151243) determines the driver pays less attention to driving. Therefore, it may not be possible to properly present information to the driver. For this reason, in the present technical field, it is desirable to properly present information to the driver of the vehicle.

According to the present disclosure, there is provided an information presentation apparatus of a vehicle capable of switching between manual driving by a driver and autonomous driving by an autonomous driving system, the apparatus including an activity determination unit configured to determine whether the driver engages in a driving activity or a non-driving activity, based on a detection result of a state detection sensor detecting a state of the driver; an engagement level calculation unit configured to calculate a driver engagement level related to driving, based on at least one of a determination result of the driving activity and a determination result of the non-driving activity in a predetermined engagement level calculation period; a system confidence level acquisition unit configured to acquire a system confidence level of autonomous driving control when the autonomous driving system autonomously drives the vehicle, from the autonomous driving system; and an information presentation unit configured to present information to the driver based on the calculated engagement level and the acquired system confidence level.

The information presentation apparatus calculates the engagement level based on at least one of the determination result of the driving activity and the determination result of the non-driving activity in the predetermined engagement level calculation period. Therefore, for example, even though the driver switches the activity between the driving activity and the non-driving activity in a short time, the information presentation apparatus is capable of more properly calculating the engagement level related to driving. In addition, the information presentation apparatus is capable of presenting the information to the driver based on the system confidence level of the autonomous driving control. As a result, the information presentation apparatus is capable of properly presenting the information to the driver of the vehicle based on the engagement level and the system confidence level.

The engagement level calculation unit may be configured to calculate the engagement level based on an activity ratio which is a ratio between a time for which it is determined that the driving activity is performed and a time for which it is determined that the non-driving activity is performed in the engagement level calculation period. In this case, the information presentation apparatus is capable of more properly calculating the engagement level related to driving.

The information presentation unit may be configured to present the information based on whether the engagement level is greater than or less than a predetermined engagement level threshold value, and change the engagement level threshold value based on the system confidence level. In this case, the information presentation apparatus is capable of more properly presenting the information based on the system confidence level.

The information presentation apparatus may further include a switching frequency calculation unit configured to calculate a frequency of switching between the driving activity and the non-driving activity in the engagement level calculation period, based on a determination result of the activity determination unit. The information presentation unit may be configured to present the information based on the engagement level, the system confidence level, and the switching frequency. Herein, as an example, if the time for which the non-driving activity is performed is long and the switching frequency is low, it is considered that the driver is immersed in the non-driving activity. However, even though the time for which the non-driving activity is performed is long, if the switching frequency is high, it is considered that the driver pays attention also to driving the vehicle. For this reason, the information presentation apparatus is capable of more properly presenting the information to the driver by presenting the information also based on the switching frequency.

The information presentation unit may be configured to present the information based on whether the switching frequency is greater than or less than a predetermined switching frequency threshold value, and to change the switching frequency threshold value based on the system confidence level. In this case, the information presentation apparatus is capable of more properly presenting the information based on the system confidence level.

The activity determination unit may be configured to further determine whether the non-driving activity is a first non-driving activity or a second non-driving activity different from the first non-driving activity. The engagement level calculation unit may be configured to calculate the engagement level for each of the first non-driving activity and the second non-driving activity based on a first activity ratio which is a ratio between a time for which it is determined that the driving activity is performed and a time for which it is determined that the first non-driving activity is performed in the engagement level calculation period, and a second activity ratio which is a ratio between a time for which it is determined that the driving activity is performed and a time for which it is determined that the second non-driving activity is performed in the engagement level calculation period. In this case, the information presentation apparatus is capable of determining the type of the non-driving activity, and more properly presenting the information to the driver based on each activity of the first non-driving activity and the second non-driving activity.

According to the present disclosure, it is possible to properly present the information to the driver of the vehicle.

BRIEF DESCRIPTION OF THE DRAWINGS

FIG. 3 is a table illustrating an engagement level threshold value set for each system confidence level.

FIG. 4 is a table illustrating a switching frequency threshold value set for each system confidence level.

FIG. 8 is a table illustrating an engagement level threshold value set for the type of each non-driving activity based on the system confidence level.

DETAILED DESCRIPTION

Hereinbelow, embodiments of the present disclosure will be described with reference to the drawings. In the description of the drawings, the same reference signs will be assigned to the same elements, and duplicated descriptions will be omitted.

First Embodiment

Figure 1:
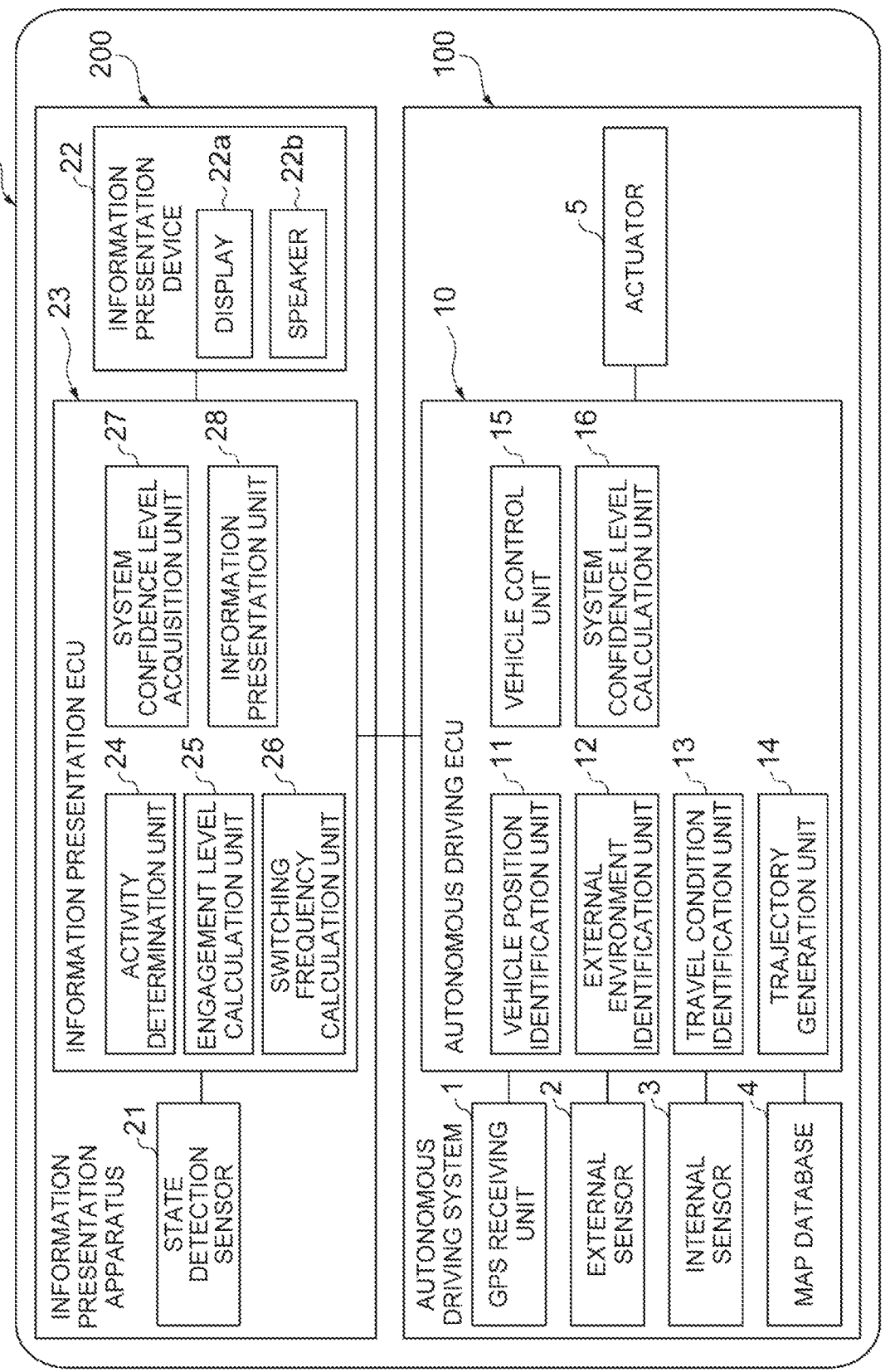
FIG. 1 is an example of a functional block diagram of a vehicle including an information presentation apparatus of a first embodiment.

Firstly, a first embodiment will be described. As illustrated in FIG. 1, an information presentation apparatus 200 of the first embodiment is installed in a vehicle V such as passenger car, the driving mode of which can be switched between manual driving and autonomous driving. The manual driving implies that a driver of the vehicle V independently drives the vehicle V. The autonomous driving is vehicle control by which the vehicle V autonomously travels to a preset destination. In the autonomous driving, the driver does not need to drive, and the vehicle V travels autonomously. Hereinbelow, an autonomous driving system 100 installed in the vehicle V controls the autonomous driving of the vehicle V.
(Details of Autonomous Driving System)

The autonomous driving system 100 includes a global positioning system (GPS) receiving unit 1; an external sensor 2; an internal sensor 3; a map database 4; an actuator 5; and an autonomous driving electronic control unit (ECU) 10.

The GPS receiving unit 1 measures the position of the vehicle V by receiving signals from three or more GPS satellites. A specific example of the position is a latitude and longitude. The GPS receiving unit 1 transmits measured position information of the vehicle V to the autonomous driving ECU 10.

The external sensor 2 is a detector that detects objects around the vehicle V. The objects include moving objects such as other vehicles and pedestrians in addition to stationary objects such as guardrails, utility poles, and parked vehicles. The external sensor 2 includes at least one of a camera and a radar sensor. The camera is an image capturing device that captures images of surroundings (at least a region in front of) of the vehicle V. The camera transmits image information of the surroundings of the vehicle V to the autonomous driving ECU 10. The camera may be a monocular camera or a stereo camera. The radar sensor is a detection device that detects objects around the vehicle V by using radio waves (for example, millimeter waves) or light. Examples of the radar sensor include a millimeter wave radar and a light detection and ranging (LIDAR). The radar sensor detects objects by transmitting radio waves or light to the surroundings of the vehicle V and receiving radio waves or light reflected by the objects. The radar sensor transmits detected object information to the autonomous driving ECU 10.

The internal sensor 3 is a detector that detects a travel condition of the vehicle V. In order to detect the travel condition of the vehicle V, the internal sensor 3 includes at least one of a vehicle speed sensor, an acceleration sensor, and a yaw rate sensor.

The vehicle speed sensor is a detector that detects a speed of the vehicle V. An example of the vehicle speed sensor is a wheel speed sensor which is provided in a wheel of the vehicle V, a drive shaft rotating integrally with wheels, or the like and detects a rotational speed of the wheel. The vehicle speed sensor transmits detected vehicle speed information of the vehicle V to the autonomous driving ECU 10. The acceleration sensor is a detector that detects an acceleration of the vehicle V. The acceleration sensor includes a longitudinal acceleration sensor that detects an acceleration of the vehicle V in a forward and backward direction, and a lateral acceleration sensor that detects a lateral acceleration of the vehicle V. The acceleration sensor transmits detected acceleration information of the vehicle V to the autonomous driving ECU 10. The yaw rate sensor is a detector that detects a yaw rate (rotation angular speed) of the vehicle V around a vertical axis of gravity. An example of the yaw rate sensor is a gyro sensor. The yaw rate sensor transmits detected yaw rate information of the vehicle V to the autonomous driving ECU 10.

The map database 4 is a database including map information. The map database 4 is stored in a storage unit installed in the vehicle V. The map information contains position information of roads, shape information (curves, the classifications of straight roads, the curvatures of curves, and the like) of roads, position information of intersections and diverging points, position information of buildings, and the like. The map information may contain position information of crosswalks, position information of temporary stop lines, and the like. The map information contains also position information of landmarks. The landmark is an object, the position of which is already known on the map, and which is used as a datum point to identify the map position of the vehicle V. The landmarks are capable of containing road surface markings such as temporary stop lines, utility poles, road dividing lines, traffic signals, and the like. The map database 4 may be stored in a computer of a facility such as an information processing center capable of communicating with the vehicle V. Position information of the landmarks may be stored in a database separate from the map database.

The actuator 5 is a device that controls the traveling of the vehicle V. The actuator 5 contains an engine actuator, a brake actuator, and a steering actuator. The engine actuator controls the driving force of the vehicle V by changing the amount of air being supplied to an engine in response to control signals from the autonomous driving ECU 10. As a specific example, the engine actuator controls the driving force of the vehicle V by changing a throttle opening. If the vehicle V is a hybrid or electric vehicle, the engine actuator controls the driving force of a motor which is a power source. The brake actuator controls a braking force being applied to the wheels of the vehicle V by controlling a brake system in response to control signals from the autonomous driving ECU 10. A hydraulic brake system can be used as the brake system. In response to control signals from the autonomous driving ECU 10, the steering actuator controls the driving of an assist motor of an electric power steering system, which controls steering torque. Therefore, the steering actuator controls the steering torque of the vehicle V.

The autonomous driving ECU 10 is an electronic control unit having a central processing unit (CPU), a read-only memory (ROM), a random access memory (RAM), a controller area network (CAN) communication circuit, and the like. The autonomous driving ECU 10 realizes various functions, which will be described later, by controlling hardware based on signals output from the CPU.

The autonomous driving ECU 10 has a vehicle position identification unit 11; an external environment identification unit 12; a travel condition identification unit 13; a trajectory generation unit 14; a vehicle control unit 15; and a system confidence level calculation unit 16.

The vehicle position identification unit 11 identifies the map position of the vehicle V based on the position information from the GPS receiving unit 1 and the map information of the map database 4. In addition, the vehicle position identification unit 11 may estimate the map position of the vehicle V using a simultaneous localization and mapping (SLAM) technique or the like based on the position information of the landmarks, which is contained in the map information of the map database 4, and a detection result of the external sensor 2. The vehicle position identification unit 11 may identify the map position of the vehicle V using other well-known techniques.

The external environment identification unit 12 identifies an external environment of the vehicle V based on a detection result (object information from the radar sensor and/or image information from the camera) of the external sensor 2. The external environment contains the conditions of objects around the vehicle V. The conditions of an object contain, for example, a relative position and a relative speed of the object with respect to the vehicle V.

The external environment may contain identified dividing lines (lane-boundary lines, central lines, and the like) around the vehicle V. The external environment identification unit 12 identifies relative positions of the dividing lines with respect to the vehicle V using well-known white line recognition based on the detection result of the external sensor 2.

The travel condition identification unit 13 identifies conditions of the traveling vehicle V based on a detection result of the internal sensor 3. The travel condition contains a vehicle speed of the vehicle V, an acceleration of the vehicle V, and a yaw rate of the vehicle V. Specifically, the travel condition identification unit 13 identifies the vehicle speed of the vehicle V based on the vehicle speed information from the vehicle speed sensor. The travel condition identification unit 13 identifies the acceleration (longitudinal acceleration and lateral acceleration) of the vehicle V based on the acceleration information from the acceleration sensor. The travel condition identification unit 13 identifies the yaw rate of the vehicle V based on the yaw rate information from the yaw rate sensor.

The trajectory generation unit 14 generates a trajectory used in the autonomous driving of the vehicle V. The trajectory generation unit 14 generates a trajectory for the autonomous driving based on the preset destination, the map information of the map database 4, the map position of the vehicle V identified by the vehicle position identification unit 11, the external environment of the vehicle V identified by the external environment identification unit 12, and the travel condition (vehicle speed, yaw rate, and the like) of the vehicle V identified by the travel condition identification unit 13. The destination may be set by an occupant of the vehicle V, or may be a destination proposed by the autonomous driving system 100 or a well-known navigation system.

The trajectory generation unit 14 obtains a travel route for the autonomous driving based on the destination, the map information, and the map position of the vehicle V. The travel route is a route on which the vehicle V travels autonomously, and is a route from the map position (present position) of the vehicle V to a destination. The travel route may be set by a well-known navigation system. The travel route can be represented by, for example, a lane-based route. The trajectory generation unit 14 generates from the map information a trajectory for enabling the autonomous driving of the vehicle V along the travel route.

The trajectory contains a path on which the vehicle V travels autonomously, and a vehicle speed profile of the autonomous driving. The path is a predetermined track along which the vehicle V travels autonomously on the travel route. The path can be defined by, for example, data (steering angle profile) of changes in the steering angle of the vehicle V in response to the positions of the vehicle V on the travel route. The position on the travel route is, for example, a set longitudinal position that is set at each predetermined interval (for example, 1 m) on the travel route in a travel direction. The steering angle profile is data in which the steering angle is mapped onto a target steering angle at each set longitudinal position.

The trajectory generation unit 14 generates a travel path of the vehicle V based on, for example, the travel route, the map information, the external environment of the vehicle V, and the travel condition of the vehicle V. The trajectory generation unit 14 generates a path such that, for example, the vehicle V passes through the centers of lanes contained in the travel route.

The vehicle speed profile is, for example, data in which the vehicle speed is mapped onto a target vehicle speed at each set longitudinal position. The set longitudinal position may not be set based on distance, but the travel time of the vehicle V. The set longitudinal position may be set as a position where the vehicle V will reach after one second, or a position where the vehicle V will reach after two seconds.

The trajectory generation unit 14 generates the vehicle speed profile based on, for example, the path and speed related information such as legal speed limit contained in the map information. A set speed preset for a position or section on the map may be used instead of the legal speed limit. The trajectory generation unit 14 generates a trajectory for the autonomous driving from the path and the vehicle speed profile. The trajectory is not limited to being defined as described above. The trajectory may have information required to realize the autonomous driving of the vehicle V.

The vehicle control unit 15 autonomously drives the vehicle V. The vehicle control unit 15 autonomously drives the vehicle V based on the map information, the map position of the vehicle V, the external environment of the vehicle V, the travel condition of the vehicle V, and the trajectory. The vehicle control unit 15 executes autonomous driving along the trajectory generated by the trajectory generation unit 14, and executes autonomous emergency avoidance or the like in emergencies. The vehicle control unit 15 autonomously drives the vehicle V by transmitting control signals to the actuator 5.

The system confidence level calculation unit 16 calculates a system confidence level related to the autonomous driving executed by the autonomous driving system 100, based on at least one of the map position of the vehicle V, the external environment of the vehicle V, the travel condition of the vehicle V, and the trajectory of the vehicle V. The system confidence level is an index indicating the reliability (certainty) of the autonomous driving system 100 for the autonomous driving. The system confidence level corresponds to whether it is possible to continue the autonomous driving.

The system confidence level calculation unit 16 calculates a system confidence level based on, for example, the external environment of the vehicle V identified by the external environment identification unit 12. Specifically, if the number of moving objects such as other vehicles around the vehicle V is greater than or equal to a predetermined number, the system confidence level calculation unit 16 may calculate the system confidence level at a smaller value compared to if the number of moving objects around the vehicle V is less than the predetermined number. If there is a proceeding vehicle in a predetermined distance in front of the vehicle V, the system confidence level calculation unit 16 may calculate the system confidence level at a smaller value compared to if there is no such preceding vehicle.

If there is a proceeding vehicle in the predetermined distance in front of the vehicle V, the shorter the inter-vehicle distance between the vehicle V and the preceding vehicle is, the less the value of the system confidence level calculated by the system confidence level calculation unit 16 may become. If there is a following vehicle in a predetermined distance in back of the vehicle V, the system confidence level calculation unit 16 may calculate the system confidence level at a smaller value compared to if there is no such following vehicle. If there is a side-by-side vehicle traveling alongside of the vehicle V, the system confidence level calculation unit 16 may calculate the system confidence level at a smaller value compared to if there is no such side-by-side vehicle.

If an object in front of the vehicle V has a time to collision (TTC) less than a TTC threshold value, the system confidence level calculation unit 16 may calculate the system confidence level at a smaller value compared to if there is no such object in front of the vehicle V which has a TTC less than the TTC threshold value. An inter-vehicle time may be used instead of the TTC. The TTC threshold value is a predetermined threshold value. Hereinbelow, various "threshold values" in the description of the specification are predetermined threshold values.

If there is a pedestrian in a predetermined distance from the vehicle V in the travel direction of the vehicle V, the system confidence level calculation unit 16 may calculate the system confidence level at a smaller value compared to if there is no such pedestrian. If there is a pedestrian moving across the trajectory of the vehicle V, the system confidence level calculation unit 16 may calculate the system confidence level at a smaller value compared to if there is no such pedestrian. The same scheme can be applied to not only pedestrian but also bicycles, personal mobility, and the like.

If other vehicles around the vehicle V make abnormal movement, the system confidence level calculation unit 16 may calculate the system confidence level at a smaller value compared to if other vehicles do not make abnormal movement. The abnormal movement is movement which is abnormal and other vehicles are not expected to make in normal travel situations. The abnormal movement is capable of containing sudden deceleration, sudden acceleration, sudden steering, lighting up a hazard lamp, and the like. If other vehicles around the vehicle V deviate from a preset normal movement, the system confidence level calculation unit 16 may identify that other vehicles make abnormal movement. The normal movement can be defined as movement where acceleration or deceleration is less than or equal to a threshold value and the vehicle travels along a lane at a speed less than or equal to a maximum legal speed limit for the lane.

If the detection range blockage percentage of the external sensor 2 which is blocked by buildings, other vehicles, and the like, is greater than or equal to a blockage threshold value, the system confidence level calculation unit 16 may calculate the system confidence level at a smaller value compared to if the detection range blockage percentage of the external sensor 2 is less than the blockage threshold value. The system confidence level calculation unit 16 may identify landmarks on the map contained in the detection range of the external sensor 2, based on the map position of the vehicle V and the position information of the landmarks contained in the map information, and match the identified landmarks with landmarks (stationary objects) identified by the external environment identification unit 12. If a difference number, which is determined by subtracting the number of the landmarks identified by the external environment identification unit 12 from the number of the landmarks on the map contained in the detection range of the external sensor 2, is greater than or equal to a difference threshold value, the system confidence level calculation unit 16 may calculate the system confidence level at a smaller value compared to if the difference number is less than the difference threshold value. The system confidence level calculation unit 16 may identify the number of landmarks on the map contained in the detection range of the external sensor 2, based on how much percentage of the detection range of the external sensor 2 is blocked by buildings and the like.

The system confidence level calculation unit 16 may calculate the system confidence level based on the tracking status of moving objects such as other vehicles which are an external environment of the vehicle V. If a tracked moving object is lost in the detection range of the external sensor 2, the system confidence level calculation unit 16 may calculate the system confidence level at a smaller value compared to if such moving object is not lost. If the shape or volume change percentage of a moving object being tracked is greater than or equal to a predetermined percentage, since there is a high possibility of a plurality of objects being falsely identified as one moving object, the system confidence level calculation unit 16 may calculate the system confidence level at a smaller value compared to if the shape or volume of the moving object is not changed. If the relative speed of a moving object being tracked is suddenly changed, since there is a high possibility of a plurality of objects moving at different speeds being falsely identified as one object, the system confidence level calculation unit 16 may calculate the system confidence level at a smaller value compared to if the relative speed of the moving object is not suddenly changed. For example, if a speed change in a predetermined time is greater than or equal to a sudden change threshold value, the system confidence level calculation unit 16 is capable of identifying that the relative speed is suddenly changed.

If the external environment of the vehicle V contains an identified traffic signal in front of the vehicle V and the shape of the identified traffic signal does not coincide with the shape of the traffic signal stored in the map information (for example, if the number of lights of the identified traffic signal is three and the identified traffic signal includes an arrow light, and the traffic signal contained in the map information is a three-light traffic signal with three lights), the system confidence level calculation unit 16 may calculate the system confidence level at a smaller value compared to if the shape of the identified traffic signal coincides with the shape of the traffic signal stored in the map information. Not only may the shape of a traffic signal but also the dimensions of the traffic signal be taken into consideration. In addition, the shape or dimensions of a landmark other than the traffic signal may be used.

If the external environment of the vehicle V contains the weather around the vehicle V and the weather around the vehicle V is rainy, the system confidence level calculation unit 16 may calculate the system confidence level at a smaller value compared to if the weather around the vehicle V is fine. The weather around the vehicle V can be determined based on image information from the camera or a detection result of the radar sensor. The weather around the vehicle V may be determined also based on a wiper operation status or the like of the vehicle V.

The system confidence level calculation unit 16 may calculate the system confidence level based on the level of interference of a moving object with the trajectory of the vehicle V. The level of interference of the moving object with the trajectory of the vehicle V can be calculated using a technique described in, for example, Japanese Unexamined Patent Publication No. 2007-23454. For example, the greater the level of interference of the moving object with the trajectory of the vehicle V is, the less the value of the system confidence level calculated by the system confidence level calculation unit 16 becomes.

The system confidence level calculation unit 16 may calculate the system confidence level based on the risk level of a moving object around the vehicle V. The risk level of the moving object around the vehicle V can be calculated using a technique described in, for example, Japanese Unexamined Patent Publication No. 2008-158969. For example, the greater the risk level of the moving object with respect to the trajectory of the vehicle V is, the less the value of the system confidence level calculated by the system confidence level calculation unit 16 becomes.

The system confidence level calculation unit 16 may calculate the system confidence level based on the map position of the vehicle V identified by the vehicle position identification unit 11. For example, if the position of the vehicle V is identified using landmarks in addition to position information from the GPS receiving unit 1, the system confidence level calculation unit 16 calculates the system confidence level at a smaller value compared to if the position of the vehicle V is identified only based on the position information from the GPS receiving unit 1.

If the vehicle V is located in an area where the accuracy of the map information is low, the system confidence level calculation unit 16 may calculate the system confidence level at a smaller value compared to if the vehicle V is located in other areas. Information as to whether map information of an area has a low accuracy is mapped onto, for example, the map information in advance. If the number of GPS satellites, from which the GPS receiving unit 1 receives signals, is greater than or equal to a GPS threshold value, the system confidence level calculation unit 16 may calculate the system confidence level at a smaller value compared to if the number of the GPS satellites is less than the GPS threshold value. If GPS satellites, from which the GPS receiving unit 1 receives signals, are disposed in a scattered pattern, the system confidence level calculation unit 16 may calculate the system confidence level at a smaller value compared to if the GPS satellites are disposed in a clustered pattern.

If the number of identified landmarks located around the vehicle V is less than a landmark threshold value, the system confidence level calculation unit 16 may calculate the system confidence level at a smaller value compared to if the number of the identified landmarks is greater than or equal to the landmark threshold value. If a positional relationship between a plurality of identified landmarks around the vehicle V does not coincide with a positional relationship between the landmarks in the map information, the system confidence level calculation unit 16 may calculate the system confidence level at a smaller value compared to if the positional relationship between the plurality of identified landmarks coincides with the positional relationship between the landmarks in the map information. If the positional relationship between the plurality of identified landmarks does not coincide with the positional relationship between the landmarks in the map information, and an average of the position errors of the landmarks is less than a predetermined distance, the system confidence level calculation unit 16 may calculate the system confidence level at a smaller value compared to if the average of the position errors of the landmarks is greater than or equal to the predetermined distance. The system confidence level calculation unit 16 may use a median or a total value instead of the average.

If the vehicle V is located in complicated road conditions such as intersection, railway crossing, merging section, and diverging section, the system confidence level calculation unit 16 may calculate the system confidence level at a smaller value compared to if the vehicle V is not located in complicated road conditions. If the vehicle V is located in a low visibility area preset in the map information, the system confidence level calculation unit 16 may calculate the system confidence level at a smaller value compared to if the vehicle V is not located in a low visibility area.

The system confidence level calculation unit 16 may calculate the system confidence level based on a travel condition of the vehicle V identified by the travel condition identification unit 13. If the detected vehicle speed of the vehicle V indicates an abnormal value, the system confidence level calculation unit 16 may calculate the system confidence level at a smaller value compared to if the detected vehicle speed does not indicate an abnormal value. For example, if the difference between a one frame previously detected vehicle speed and a presently detected vehicle speed is greater than or equal to an abnormality detection threshold value (for example, greater than or equal to 20 km/h), the system confidence level calculation unit 16 identifies that the vehicle speed indicates an abnormal value. The same scheme can be applied also to the acceleration and the yaw rate.

The system confidence level calculation unit 16 may calculate the system confidence level from the result of comparison between a travel condition of the vehicle V, which is based on a travel condition of the vehicle V identified by the travel condition identification unit 13 and a trajectory generated by the trajectory generation unit 14 and is represented by the generated trajectory, and a travel condition of the vehicle V identified as a result of performing autonomous driving control. For example, if the deviation between vehicle speeds contained in the generated trajectory and vehicle speeds recorded as a result of autonomous driving control is greater than or equal to a deviation threshold value, the system confidence level calculation unit 16 may calculate the system confidence level at a smaller value compared to if the deviation is less than the deviation threshold value. The same scheme can be applied also to the acceleration and the yaw rate.

Furthermore, if an abnormality of various sensors (the external sensor 2, the internal sensor 3, and the like) of the vehicle V is detected, the system confidence level calculation unit 16 may calculate the system confidence level at a smaller value compared to if various sensors are in normal operation. A well-known abnormality detection technique can be used to detect an abnormality of the sensors.

(Information Presentation Apparatus)

The information presentation apparatus 200 presents information to the driver of the vehicle V. The information presentation apparatus 200 includes a state detection sensor 21; an information presentation device 22; and an information presentation ECU 23.

The state detection sensor 21 is a detector that detects a state of the driver. In the present embodiment, the state detection sensor 21 is, for example, a driver monitoring camera that captures images of the driver. The driver monitoring camera is provided, for example, on a cover of a steering column of the vehicle V at a position in front of the driver, and captures images of the driver. A plurality of the driver monitoring cameras may be provided to capture images of the driver in multiple directions.

The information presentation device 22 is a device that presents information to the driver. The information presentation device 22 includes a display 22a and a speaker 22b. The display 22a is an indicator that is provided visible from the driver inside the vehicle V. The display 22a is provided, for example, in a dashboard of the vehicle V. The display 22a displays various images in response to control signals from the information presentation ECU 23. The display 22a may be a head-up display that projects and displays an image onto a windshield of the vehicle V.

The speaker 22b is a voice output unit provided in the vehicle V. The speaker 22b is provided, for example, on the inside of a door and on the back side of an instrument panel of the vehicle V. The speaker 22b outputs various voices in response to control signals from the information presentation ECU 23.

Similar to the autonomous driving ECU 10, the information presentation ECU 23 is an electronic control unit having a CPU, a ROM, a RAM, a CAN communication circuit, and the like. The information presentation ECU 23 realizes various functions, which will be described later, by controlling hardware based on signals output from the CPU.

The information presentation ECU 23 has an activity determination unit 24; an engagement level calculation unit 25; a switching frequency calculation unit 26; a system confidence level acquisition unit 27; and an information presentation unit 28.

The activity determination unit 24 determines whether the driver engages in a driving activity or a non-driving activity, based on a detection result of the state detection sensor 21. The execution of a process of determining whether the driver engages in a driving activity or a non-driving activity is repeated, for example, at each predetermined time interval by the activity determination unit 24.

Herein, based on images captured by the driver monitoring camera serving as the state detection sensor 21, the activity determination unit 24 determines whether the driver engages in a driving activity or a non-driving activity. The driving activity is the driver's activity of driving the vehicle V. The non-driving activity is an activity engaged in by the driver other than driving the vehicle V. The non-driving activity is an activity, for example, watching movies, texting such as writing e-mails, reading, or drowsing. In an example described hereinbelow, the non-driving activity implies that the driver watches a movie on a center display for watching movies provided in the vicinity of the center of the dashboard.

Figure 2:
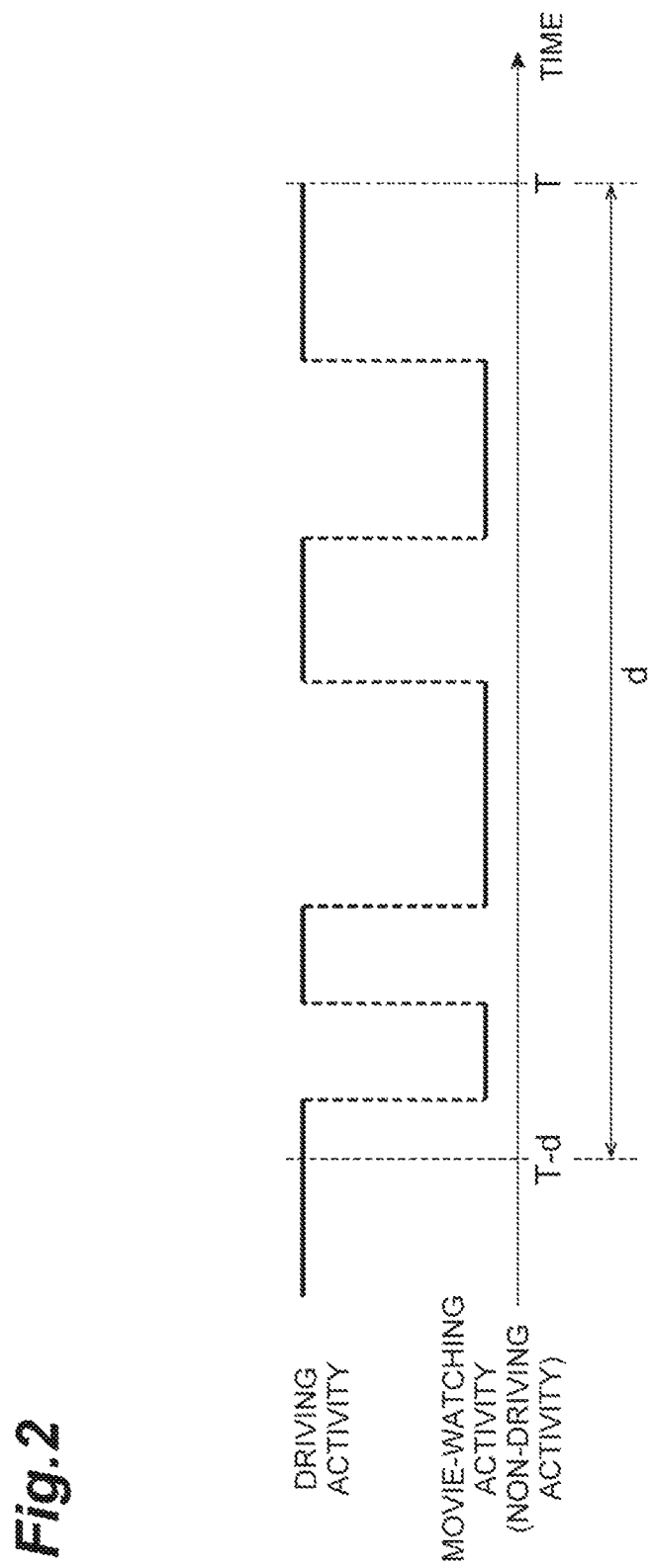
FIG. 2 is a graph illustrating the change of an activity over time between a driving activity and a non-driving activity.

Using a well-known technique based on captured images of the driver, the activity determination unit 24 is capable of determining whether the driver engages in the driving activity or the non-driving activity. For example, the activity determination unit 24 estimates the orientation of the head (face) of the driver based on the captured images. If the head of the driver points to the front of the vehicle V, the activity determination unit 24 is capable of determining that the driver performs the driving activity. If the head of the driver points to the center display for watching movies, the activity determination unit 24 is capable of determining that the driver performs the non-driving activity. FIG. 2 is a graph where determination results of the activity determination unit 24 are plotted over time.

Herein, based on a detection result of the state detection sensor 21, the activity determination unit 24 determines whether the driver performs the driving activity. If it is not determined that the driving activity is engaged, the activity determination unit 24 may determine that the driver performs the non-driving activity. In this case, if based on the detection result of the state detection sensor 21, it can be determined only whether the driver engages in the driving activity, the activity determination unit 24 is capable of determining whether the driver performs the driving activity or the non-driving activity. Therefore, even though there is no given determination information for determining that the driver engages in various non-driving activities, based on a result of determining that the driver engages in the driving activity, the activity determination unit 24 is capable of determining that the driver engages in the non-driving activity.

In addition, on the contrary, based on a detection result of the state detection sensor 21, the activity determination unit 24 determines whether the non-driving activity is performed. If it is not determined that the driver engages in the non-driving activity, the activity determination unit 24 may determine that the driver performs the driving activity. In this case, if based on the detection result of the state detection sensor 21, it can be determined only whether the driver engages in the non-driving activity, the activity determination unit 24 is capable of determining whether the driver performs the driving activity or the non-driving activity. Therefore, even though there is no given determination information for determining that the driver engages in various driving activities, based on a result of determining that the driver engages in the non-driving activity, the activity determination unit 24 is capable of determining that the driver engages in the driving activity.

The engagement level calculation unit 25 calculates a driver engagement level related to driving, based on at least one of a determination result of the driving activity and a determination result of the non-driving activity in a predetermined engagement level calculation period. In the present embodiment, the engagement level calculation unit 25 calculates a driver engagement level related to driving, based on the determination result of the driving activity and the determination result of the non-driving activity in the predetermined engagement level calculation period. Herein, the engagement level calculation unit 25 calculates an engagement level based on an activity ratio which is the ratio between the time (total time) for which it is determined that the driving activity is performed and the time (total time) for which it is determined that the non-driving activity is performed in the engagement level calculation period.

Specifically, as illustrated in FIG. 2, the engagement level calculation unit 25 calculates the activity ratio based on a determination result in engagement level calculation period d minutes from a time point T−d to a present time point T. The activity ratio referred to herein is, for example, the ratio between the time (total time) for the driver to engage in the driving activity and the time (total time) for the driver to engage in watching movies (non-driving activity) in the engagement level calculation period d. For example, if in the engagement level calculation period d, the total time for which it is determined that the driver engages in the driving activity is 200 seconds and the total time for the driver to have engaged in watching movies is 500 seconds, the activity ratio is 500/200=2.5. If the activity ratio is small, it is considered that the percentage of engagement in the driving activity is high and the safety is better.

In the present embodiment, the engagement level calculation unit 25 uses a calculated activity ratio as the engagement level. The engagement level calculation unit 25 may use an adjusted value acquired, for example, by multiplying the calculated activity ratio by a coefficient, as the engagement level.

The engagement level calculation period d may be a predetermined fixed value, or may be a value changing dependent on predetermined conditions. For example, the engagement level calculation period d may change dependent on various conditions such as places where the vehicle V travels and the condition of the vehicle V.

The switching frequency calculation unit 26 calculates the frequency of switching between the driving activity and the non-driving activity in the engagement level calculation period d, based on a determination result of the activity determination unit 24. As an example, while the switching of the activity from the driving activity to watching movies (non-driving activity) or the switching of the activity from watching movies (non-driving activity) to the driving activity is regarded as being switched once, the switching frequency calculation unit 26 counts the number of switching events. In the example illustrated in FIG. 2, the switching is performed six times in the engagement level calculation period d from the time point T−d to the time point T. For this reason, the switching frequency calculation unit 26 calculates the switching frequency at 6.

From the system confidence level calculation unit 16 of the autonomous driving system 100, the system confidence level acquisition unit 27 acquires a system confidence level of autonomous driving control when the autonomous driving system 100 autonomously drives the vehicle V.

The information presentation unit 28 presents information to the driver based on the engagement level calculated by the engagement level calculation unit 25, the switching frequency calculated by the switching frequency calculation unit 26, and the system confidence level acquired by the system confidence level acquisition unit 27. Herein, the information presentation unit 28 presents information based on whether the engagement level is greater than or less than a predetermined engagement level threshold value. In addition, the information presentation unit 28 presents information based on whether the switching frequency is greater than or less than a predetermined switching frequency threshold value.

As the information presented to the driver, the information presentation unit 28 presents information to prompt the driver to engage in the driving activity (driving by the driver) using the information presentation device 22. The information presentation unit 28 causes the information presentation device 22 to present information by transmitting control signals to the information presentation device 22. As the information to prompt the driver to engage in the driving activity, the information presentation unit 28 may display text messages or the like on the display 22a, or may output voice or the like via the speaker 22b.

For example, if the engagement level (activity ratio) is high (that is, the time for the driver to have engaged in watching movies is long) and the switching frequency is low, it is considered that the driver is much immersed in watching movies. In such case, it is necessary to increase the time for the driver to have engaged in the driving activity, and to improve the concentration of the driver on the driving activity. That is, even though it is satisfied that the engagement level is greater than the predetermined engagement level threshold value and the switching frequency is less than the predetermined switching frequency threshold value, a presentation condition can be adopted to present information to prompt the driver to engage in the driving activity. For this reason, the information presentation unit 28 determines whether the calculated engagement level and the calculated switching frequency satisfy the presentation condition.

If the presentation condition is satisfied and it is determined that the driver performs the driving activity at the present time point, the information presentation unit 28 causes the information presentation device 22 to present a message to prompt the driving activity to continue, such as "continuing to drive, please". In addition, if the presentation condition is satisfied and it is determined that the driver performs the non-driving activity at the present time point, the information presentation unit 28 causes the information presentation device 22 to present a message to prompt the driver to return to the driving activity such as "returning to drive, please". Therefore, it is possible to anticipate the effects of increasing the time for the driver to have engaged in the driving activity beyond the present time point T.

In addition, based on the system confidence level, the information presentation unit 28 changes the engagement level threshold value and the switching frequency threshold value when determining whether the engagement level and the switching frequency satisfy the presentation condition. For example, if the system confidence level is high, since the autonomous driving system 100 enables the vehicle V to more properly travel, the driver may be much immersed in watching movies. That is, if the system confidence level is high, the engagement level (the activity ratio of watching movies) may be high and the switching frequency may be low.

Specifically, as illustrated in FIG. 3, the information presentation unit 28 is capable of setting, for example, the engagement level threshold value at 2.5 if the system confidence level is high, the engagement level threshold value at 1.2 if the system confidence level is medium, and the engagement level threshold value at 0.1 if the system confidence level is low. As described above, if the system confidence level is high, the information presentation unit 28 further increases the engagement level threshold value compared to if the system confidence level is low. If the system confidence level is high, it becomes difficult to satisfy the presentation condition to prompt the driver to engage in the driving activity, and it is possible to prevent unnecessary presentation of information by increasing the engagement level threshold value.

In addition, as illustrated in FIG. 4, the information presentation unit 28 is capable of setting, for example, the switching frequency threshold value at 2 if the system confidence level is high, the switching frequency threshold value at 5 if the system confidence level is medium, and the switching frequency threshold value at 8 if the system confidence level is low. As described above, if the system confidence level is high, the information presentation unit 28 further decrease the switching frequency threshold value compared to if the system confidence level is low. If the system confidence level is high, it becomes difficult to satisfy the presentation condition to prompt the driver to engage in the driving activity, and it is possible to prevent unnecessary presentation of information by decreasing the switching frequency threshold value.

The engagement level threshold value and the switching frequency threshold value illustrated in FIGS. 3 and 4 may be set at preferred values by the driver using the information presentation apparatus 200. In this case, an upper limit value and a lower limit value of each of the engagement level threshold value and the switching frequency threshold value may be predetermined. In addition, the engagement level threshold value and the switching frequency threshold value may be predetermined at each location, and the engagement level threshold value and the switching frequency threshold value for each location may be contained in the map information. The engagement level threshold value and the switching frequency threshold value may be read out from the map information and set when the vehicle V passes through each location. In this case, the engagement level threshold value and the switching frequency threshold value may be set based on an override rate, an accident rate, a system confidence level embedded in the map information, and the like for each location. Furthermore, the engagement level threshold value and the switching frequency threshold value may be determined by the attributes of the driver. The attributes of the driver may contain any one of a gender, an age, and a personal authentication result for the driver.

Subsequently, the flow of an information presentation process performed by the information presentation apparatus 200 will be described with reference to the flowchart of FIG. 5. The information presentation process starts at the same time, for example, the vehicle V starts traveling. In addition, the process illustrated in FIG. 5 restarts from START, for example, after the elapse of a predetermined time since the process has reached END.

Figure 5:
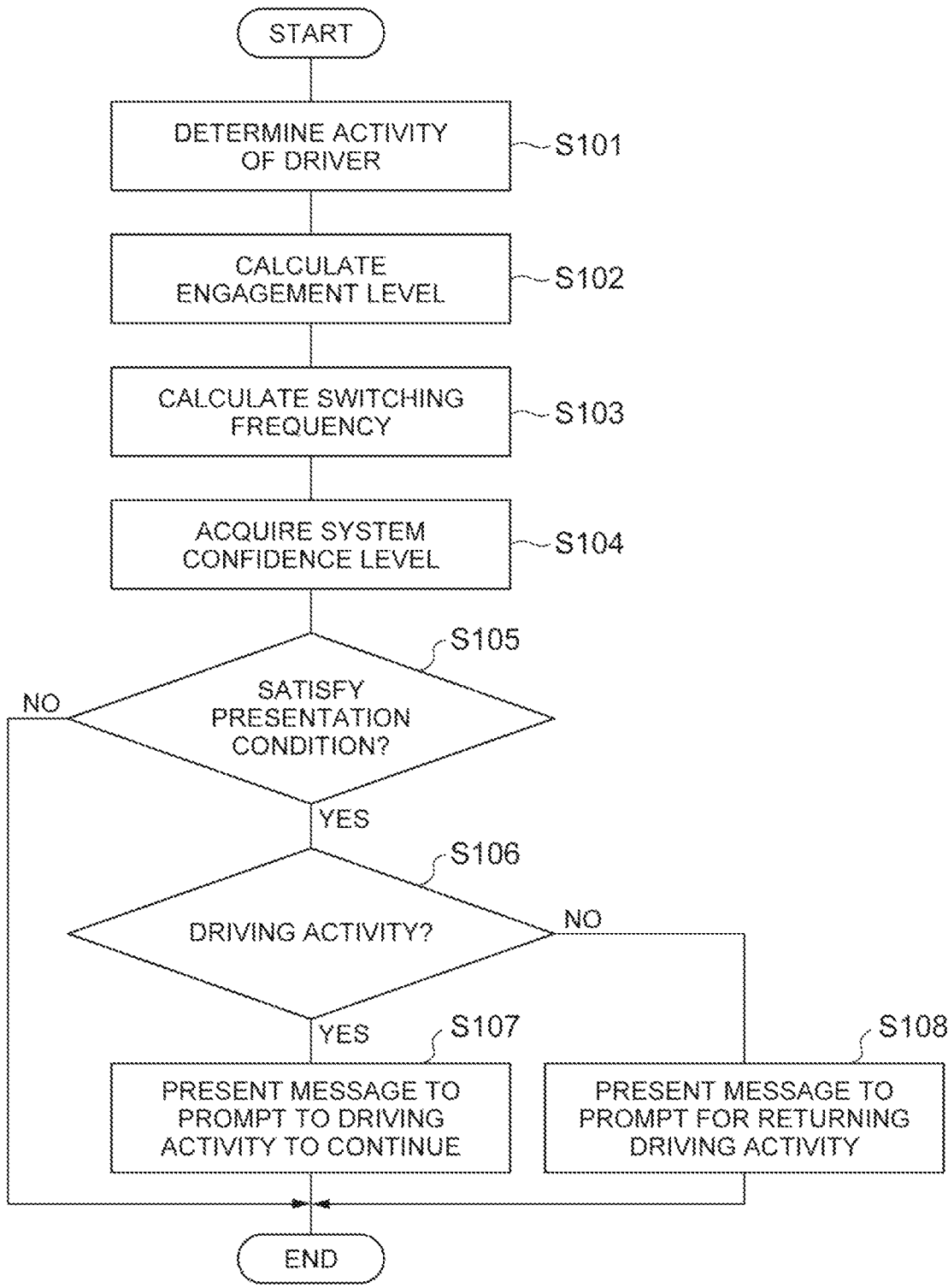
FIG. 5 is a flowchart illustrating the flow of an information presentation process.

As illustrated in FIG. 5, based on a detection result of the state detection sensor 21, the activity determination unit 24 determines whether the driver engages in the driving activity or the non-driving activity (S101). The engagement level calculation unit 25 calculates the engagement level based on a determination result of the activity determination unit 24 for engagement level calculation period d minutes from present to past (S102). The switching frequency calculation unit 26 calculates the switching frequency based on the determination result of the activity determination unit 24 in engagement level calculation period d minutes from present to past (S103). The system confidence level acquisition unit 27 acquires the system confidence level from the autonomous driving system 100 (S104).

The information presentation unit 28 determines whether the calculated engagement level and the calculated switching frequency satisfy an information presentation condition (S105). When making the determination, the information presentation unit 28 sets the engagement level threshold value and the switching frequency threshold value based on the acquired system confidence level. If the presentation condition is not satisfied (S105: NO), the information presentation apparatus 200 ends the present process without presenting information to prompt the driver to engage in the driving activity, and restarts the process from START after the predetermined time has elapsed.

If the presentation condition is satisfied (S105: YES), the information presentation unit 28 determines whether the driver performs the driving activity at a present time point (S106). If the driver performs the driving activity (S106: YES), the information presentation unit 28 causes the information presentation device 22 to present a message to prompt the driving activity to continue (S107). However, if the driver does not perform the driving activity (S106: NO), the information presentation unit 28 causes the information presentation device 22 to present a message to prompt for returning to the driving activity (S108).

As described above, the engagement level calculation unit 25 of the information presentation apparatus 200 calculates the engagement level based on a determination result of the driving activity and a determination result of the non-driving activity in the predetermined engagement level calculation period d. Therefore, for example, even though the driver switches the activity between the driving activity and the non-driving activity in a short time, the engagement level calculation unit 25 is capable of more properly calculating the engagement level. In addition, the information presentation apparatus 200 is capable of presenting information to the driver based on the system confidence level of the autonomous driving system 100. As a result, the information presentation apparatus 200 is capable of properly presenting information to the driver of the vehicle V based on the engagement level and the system confidence level.

The engagement level calculation unit 25 calculates the engagement level based on the activity ratio between the driving activity and the non-driving activity in the engagement level calculation period d. In this case, the information presentation apparatus 200 is capable of more properly calculating the engagement level related to driving.

The information presentation unit 28 changes the engagement level threshold value based on the system confidence level. In this case, the information presentation apparatus 200 is capable of more properly presenting information based on the system confidence level.

The information presentation unit 28 presents information based on the switching frequency calculated by the switching frequency calculation unit 26, the engagement level, and the system confidence level. Herein, as an example, if the time for which the non-driving activity is performed is long and the switching frequency is low, it is considered that the driver is immersed in the non-driving activity. However, even though the time for which the non-driving activity is performed is long, if the switching frequency is high, it is considered that the driver pays attention also to driving the vehicle V. For this reason, the information presentation apparatus 200 is capable of more properly presenting information to the driver by presenting the information also based on the switching frequency.

The information presentation unit 28 changes the switching frequency threshold value based on the system confidence level. In this case, the information presentation apparatus 200 is capable of more properly presenting information based on the system confidence level.

In the example described in the first embodiment, watching movies is the non-driving activity, but texting such as writing e-mails, reading, drowsing, and the like may be other non-driving activities. In addition, the non-driving activity may not be a specific non-driving activity such as watching movies, but all the activities other than the driving activity. In this case, the activity determination unit 24 may be capable of determining only whether the driver performs the driving activity, and may not determine the type of the non-driving activity, such as watching movies and texting. The engagement level calculation unit 25 may calculate the engagement level based on the time for which the driving activity is performed and other times.

Second Embodiment

Figure 6:
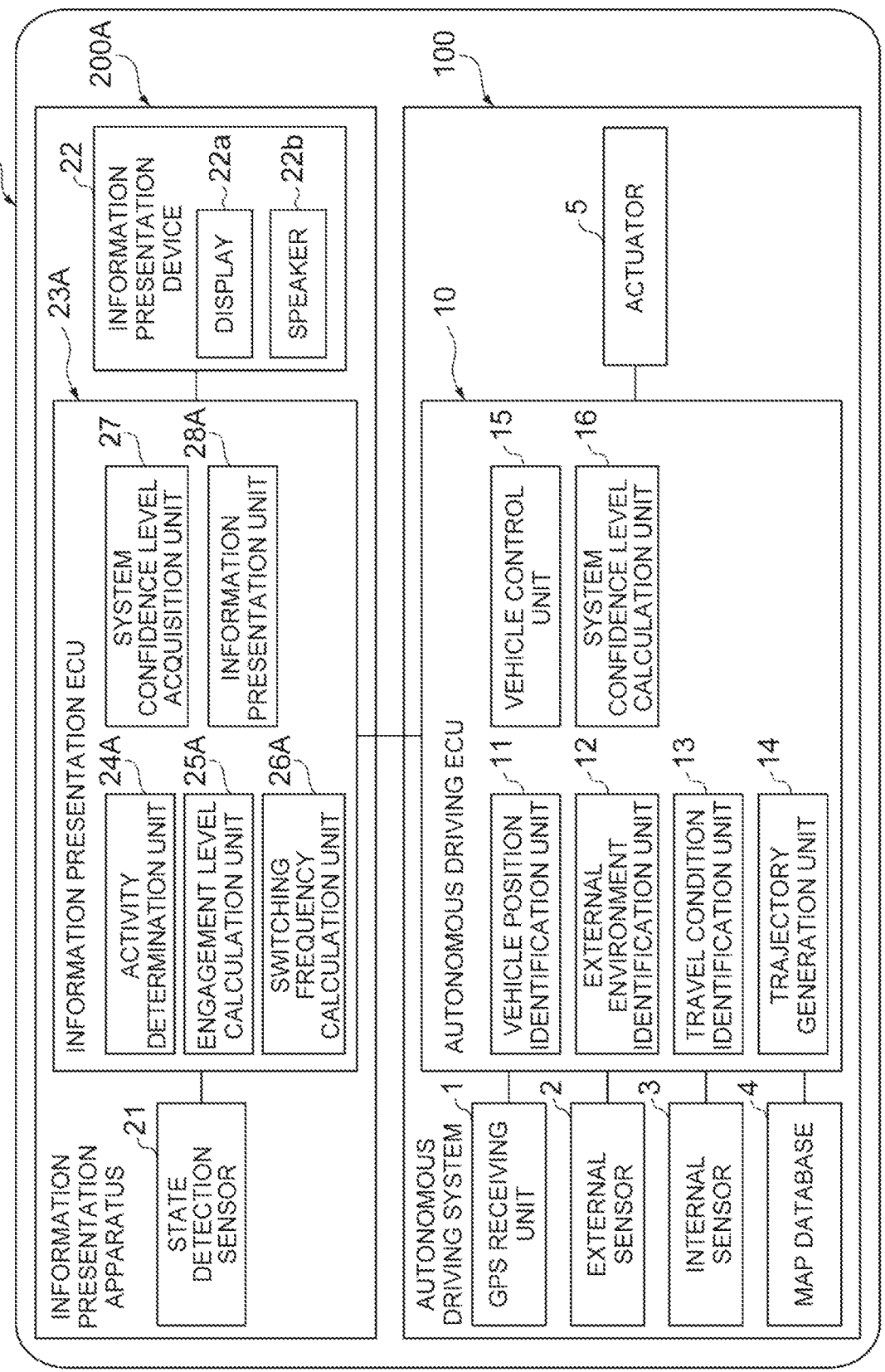
FIG. 6 is an example of a functional block diagram of a vehicle including an information presentation apparatus of a second embodiment.

Subsequently, an information presentation apparatus of a second embodiment will be described. Hereinbelow, mainly the difference between the information presentation apparatus 200 of the first embodiment and that of the second embodiment will be described. The same reference signs will be assigned to the same elements as those of the information presentation apparatus 200 of the first embodiment, and detailed descriptions of the same elements will be omitted. As illustrated in FIG. 6, an information presentation apparatus 200A of the second embodiment determines the type of the non-driving activity, calculates an engagement level for the type of each non-driving activity, and presents information.

Specifically, the information presentation apparatus 200A includes the state detection sensor 21; the information presentation device 22; and an information presentation ECU 23A. Similar to the information presentation ECU 23 of the first embodiment, the information presentation ECU 23A is an electronic control unit having a CPU, a ROM, a RAM, a CAN communication circuit, and the like. The information presentation ECU 23A has an activity determination unit 24A; an engagement level calculation unit 25A; a switching frequency calculation unit 26A; the system confidence level acquisition unit 27; and an information presentation unit 28A.

Figure 7:
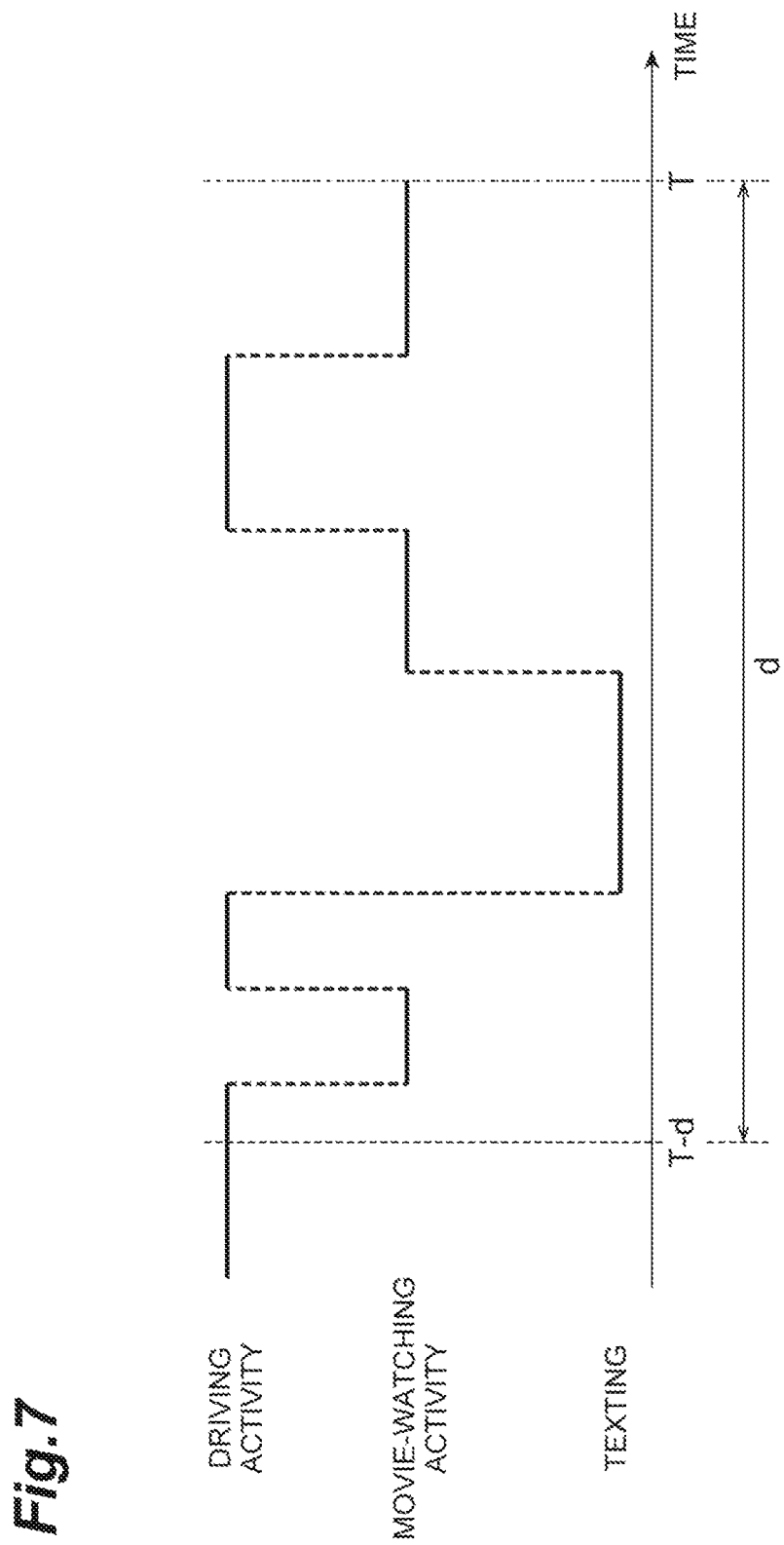
FIG. 7 is a graph illustrating the change of an activity over time between a driving activity and non-driving activities (movie-watching activity and texting).

The activity determination unit 24A determines whether a driver engages in a driving activity or a non-driving activity, based on images captured by the driver monitoring camera serving as the state detection sensor 21. Furthermore, the activity determination unit 24A determines whether the non-driving activity is a first non-driving activity or a second non-driving activity different from the first non-driving activity. That is, the activity determination unit 24A determines the type of a non-driving activity. In an example which will be described hereinbelow, the first non-driving activity is watching movies by the driver, and the second non-driving activity is texting such as writing e-mails. Using a well-known technique based on captured images of the driver, the activity determination unit 24A is capable of determining whether the driver engages in the driving activity, watching movies, or texting. FIG. 7 is a graph where determination results of the activity determination unit 24A are plotted over time.

The engagement level calculation unit 25A calculates a first activity ratio which is the ratio between the time (total time) for which it is determined that the driving activity is performed and the time (total time) for which it is determined that the driver watches a movie (first non-driving activity) in the engagement level calculation period d. In addition, the engagement level calculation unit 25A calculates a second activity ratio which is the ratio between the time (total time) for which it is determined that the driving activity is performed and the time (total time) for which it is determined that texting (second non-driving activity) is performed in the engagement level calculation period d. The engagement level calculation unit 25A calculates an engagement level for each movie watching and each texting, based on the first activity ratio and the second activity ratio.

Specifically, as illustrated in FIG. 7, the engagement level calculation unit 25A calculates the first activity ratio and the second activity ratio based on a determination result in engagement level calculation period d minutes from the time point T−d to the present time point T. The activity ratio referred to herein is, for example, the ratio of the time for the driver to have engaged in watching movies (non-driving activity) to the time for the driver to have engaged in the driving activity. For example, if in the engagement level calculation period d, the total time for which it is determined that the driver engages in the driving activity is 200 seconds and the total time for the driver to have engaged in watching movies is 400 seconds, the first activity ratio is 400/200=2.0. For example, if in the engagement level calculation period d, the total time for which it is determined that the driver engages in the driving activity is 200 seconds and the total time for the driver to have engaged in texting is 100 seconds, the second activity ratio is 100/200=0.5.

In the present embodiment, the engagement level calculation unit 25A uses the calculated first activity ratio as an engagement level for watching movies, and uses the calculated second activity ratio as an engagement level for texting. The engagement level calculation unit 25A may use adjusted values acquired, for example, by multiplying the calculated first activity ratio and the calculated second activity ratio by coefficients, as the engagement levels.

The switching frequency calculation unit 26A calculates the frequency of switching between the driving activity and the non-driving activity in the engagement level calculation period d, based on a determination result of the activity determination unit 24A. Herein, while the transition from the driving activity to the non-driving activity (watching movies or texting) is regarded as being switched once and the returning from the non-driving activity to the driving activity is regarded as being switched once, the switching frequency calculation unit 26A counts the number of switching events. In the example illustrated in FIG. 7, the switching is performed five times in the engagement level calculation period d from the time point T−d to the present time point T. For this reason, the switching frequency calculation unit 26A calculates the switching frequency at 5.

As a counting method for the switching frequency, the switching frequency calculation unit 26A may count the number of switching events while the transition from the driving activity to the non-driving activity and the returning back to the driving activity is regarded as being switched once. In this counting method, in the example illustrated in FIG. 7, the switching is performed two times in the engagement level calculation period d from the time point T−d to the present time point T. For this reason, the switching frequency calculation unit 26A may calculate the switching frequency at 2.

The information presentation unit 28A presents information to prompt the driver to engage in the driving activity based on the engagement level for each of watching movies and texting, the switching frequency, and the system confidence level. Herein, the information presentation unit 28A determines whether the engagement level for each of watching movies and texting, and the switching frequency satisfy a presentation condition. The presentation condition referred to herein is that the engagement level for either watching movies or texting is greater than a predetermined engagement level threshold value for the activity and the switching frequency is less than a predetermined switching frequency threshold value.

In addition, similar to the first embodiment, the information presentation unit 28A changes the predetermined engagement level threshold value for each of watching movies and texting based on the system confidence level, and changes the switching frequency threshold value based on the system confidence level. Specifically, for example, as illustrated in FIG. 8, the information presentation unit 28A sets the engagement level threshold value in response to the system confidence level for the type of each non-driving activity. If the system confidence level is high, the information presentation unit 28A further increases the engagement level threshold value for watching movies and the engagement level threshold value for texting compared to if the system confidence level is low.

In addition, as illustrated in FIG. 4, if the system confidence level is high, the information presentation unit 28A further decrease the switching frequency threshold value compared to if the system confidence level is low.

If the presentation condition is satisfied and it is determined that the driver performs the driving activity at the present time point, the information presentation unit 28A causes the information presentation device 22 to present a message to prompt the driving activity to continue, such as "continuing to drive, please". In addition, if the presentation condition is satisfied and it is determined that the driver performs the non-driving activity at the present time point, the information presentation unit 28A causes the information presentation device 22 to present a message to prompt the driver to return to the driving activity such as "returning to drive, please".

As described above, similar to the information presentation apparatus 200 of the first embodiment, the information presentation apparatus 200A also is capable of properly presenting information to the driver of the vehicle V by using the engagement level and the system confidence level. In addition, the information presentation apparatus 200A determines the type of the non-driving activity, and calculates the engagement level for each non-driving activity. Therefore, the information presentation apparatus 200A is capable of more properly presenting information to the driver based on each activity of the first non-driving activity and the second non-driving activity.

In the example described in the second embodiment, watching movies and texting are non-driving activities, but reading, drowsing, and the like may be other non-driving activities. In addition, the activity determination unit 24A may determine three or more types of activities as the types of non-driving activities.

(Modification Example of Second Embodiment)

For example, even though a driver watches a movie, the time taken for the driver to return to a driving activity differs depending on whether the driver watches a movie while being relaxed leaning against the back of a seat or the driver turns only the eyes to a center display for watching movies while being in a driving posture. For this reason, based on a posture determination result of the activity determination unit 24A, the information presentation apparatus 200A may treat, for example, a movie-watching activity performed in a posture A and a movie-watching activity performed in a posture B as separate activities.

In this case, the activity determination unit 24A determines the posture of the driver performing a non-driving activity in addition to determining the types of non-driving activities. The activity determination unit 24A is capable of determining the posture of the driver, for example, based on images captured by a driver monitoring camera. The activity determination unit 24A may determine the posture, for example, based on a detected angle of a backrest of a seat in which the driver sits. The engagement level calculation unit 25A separately calculates an engagement level for the movie-watching activity performed in the posture A and an engagement level for the movie-watching activity performed in the posture B. The information presentation unit 28A determines whether a presentation condition is satisfied, based on whether the calculated engagement level for each posture is greater than a predetermined engagement level threshold value for each posture, and present information. In this case, the information presentation apparatus 200A is capable of more properly presenting information to the driver in response to the posture of the driver.

A process of determining the posture of a driver and presenting information in the modification example may be applied to the information presentation apparatus 200 of the first embodiment.

Third Embodiment

Figure 9:
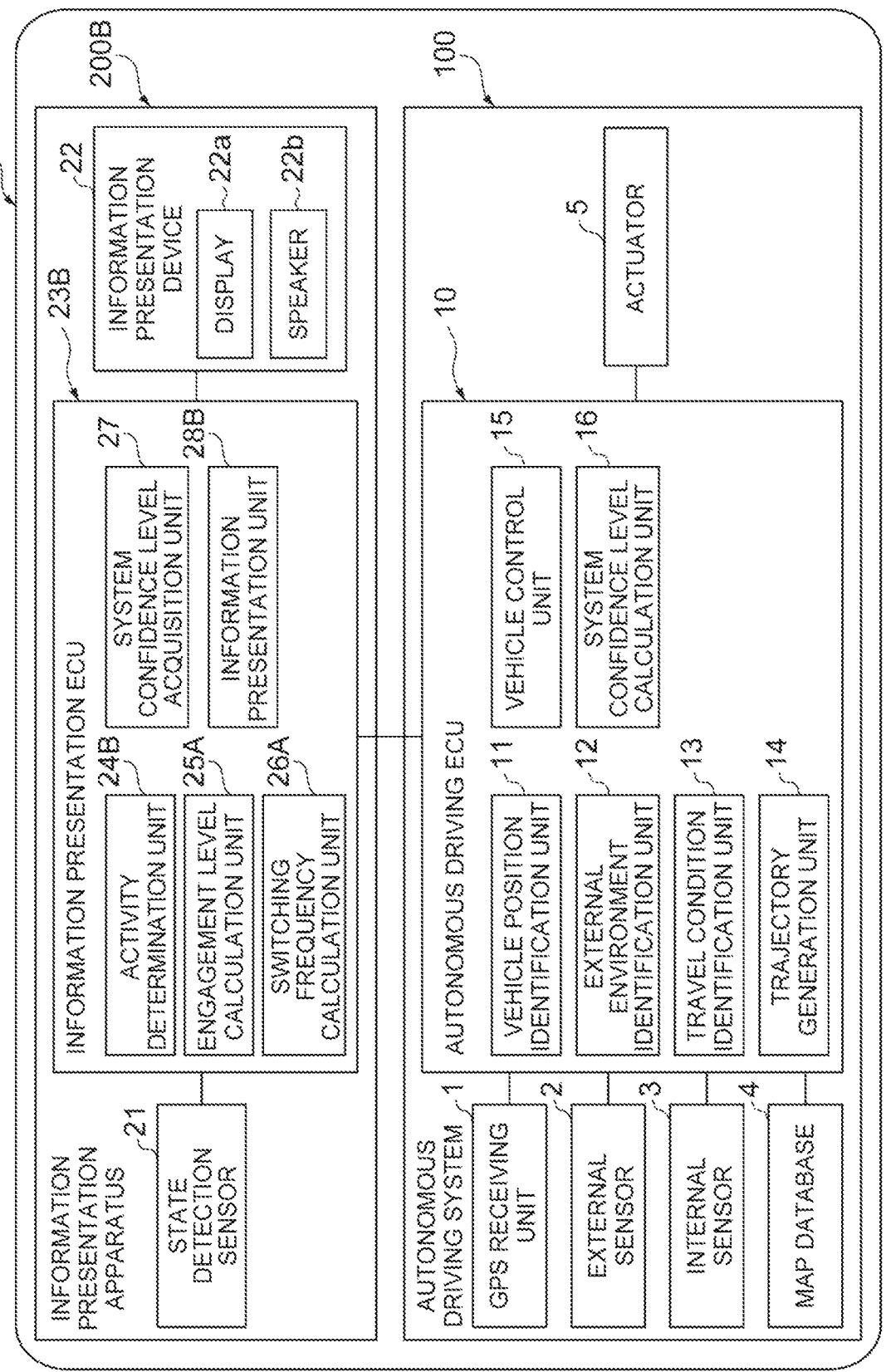
FIG. 9 is an example of a functional block diagram of a vehicle including an information presentation apparatus of a third embodiment.

Subsequently, an information presentation apparatus of a third embodiment will be described. Hereinbelow, mainly the difference between the information presentation apparatus 200A of the second embodiment and that of the third embodiment will be described. The same reference signs will be assigned to the same elements as those of the information presentation apparatus 200A of the second embodiment, and detailed descriptions of the same elements will be omitted. As illustrated in FIG. 9, an information presentation apparatus 200B of the third embodiment presents information based on the degree of deviation of the posture of a driver from a driving posture.

Specifically, the information presentation apparatus 200B includes the state detection sensor 21; the information presentation device 22; and an information presentation ECU 23B. The information presentation ECU 23B has an activity determination unit 24B; the engagement level calculation unit 25A; the switching frequency calculation unit 26A; the system confidence level acquisition unit 27; and an information presentation unit 28B.

The activity determination unit 24B determines the posture of the driver. The activity determination unit 24B is capable of determining the posture of the driver, for example, based on images captured by a driver monitoring camera. In addition, the activity determination unit 24B calculates the degree of deviation of the posture of the driver from the driving posture. As the degree of deviation from the driving posture, the activity determination unit 24B may use, for example, the difference between the angle of a specific joint (for example, elbow) when the driver is in an ideal driving posture and the present angle of the joint of the driver.

The information presentation unit 28B changes an engagement level threshold value and a switching frequency threshold value based on the calculated degree of deviation from the driving posture. Herein, if the degree of deviation from the driving posture is large, the information presentation unit 28B further decreases the engagement level threshold value compared to if the degree of deviation from the driving posture is small. For example, if the degree of deviation from the driving posture is 1.5, the information presentation unit 28B may use a value acquired by dividing a predetermined engagement level threshold value by 1.5, as the engagement level threshold value. Therefore, if the degree of deviation from the driving posture is large, it becomes easier to satisfy a presentation condition compared to if the degree of deviation from the driving posture is small.

In addition, if the degree of deviation from the driving posture is large, the information presentation unit 28B further increases the switching frequency threshold value compared to if the degree of deviation from the driving posture is small. For example, if the degree of deviation from the driving posture is 1.5, the information presentation unit 28B may use a value acquired by multiplying a predetermined switching frequency threshold value by 1.5, as the switching frequency threshold value. Therefore, if the degree of deviation from the driving posture is large, it becomes easier to satisfy the presentation condition compared to if the degree of deviation from the driving posture is small.

The information presentation unit 28B determines whether the presentation condition is satisfied, based on the engagement level threshold value and the switching frequency threshold value changed in response to the degree of deviation from the driving posture, and presents information. In this case, the information presentation apparatus 200B is capable of more properly presenting information to the driver in response to the posture of the driver.

The information presentation unit 28B may change only either the engagement level threshold value or the switching frequency threshold value in response to the degree of deviation from the driving posture.

In addition, the information presentation unit 28B may change the engagement level in response to the degree of deviation from the driving posture instead of in response to the engagement level threshold value. In this case, if the degree of deviation from the driving posture is large, the information presentation unit 28B further increases the engagement level compared to if the degree of deviation from the driving posture is small. For example, if the degree of deviation from the driving posture is 1.5, the information presentation unit 28B may use a value acquired by multiplying a calculated engagement level by 1.5, as the engagement level. Therefore, if the degree of deviation from the driving posture is large, it becomes easier to satisfy the presentation condition compared to if the degree of deviation from the driving posture is small.

Similarly, the information presentation unit 28B may change the switching frequency in response to the degree of deviation from the driving posture instead of in response to the switching frequency threshold value. In this case, if the degree of deviation from the driving posture is large, the information presentation unit 28B further decrease the switching frequency compared to if the degree of deviation from the driving posture is small. For example, if the degree of deviation from the driving posture is 1.5, the information presentation unit 28B may use a value acquired by dividing a calculated switching frequency by 1.5, as the switching frequency. Therefore, if the degree of deviation from the driving posture is large, it becomes easier to satisfy the presentation condition compared to if the degree of deviation from the driving posture is small.

A process of changing the engagement level threshold value and the like in response to the degree of deviation from the driving posture in the third embodiment may be applied to the information presentation apparatus 200 of the first embodiment.

(Modification Example of Activity Determination Unit)

Subsequently, a modification example of an activity determination unit will be described. Herein, the activity determination unit 24 of the first embodiment will be described as an example, but the modification can be applied to the activity determination units 24A and 24B of other embodiments and the modification example. Hereinbelow, there will be described a method in which the activity determination unit 24 accurately determines whether a driving activity or a non-driving activity is performed.

Figure 10:
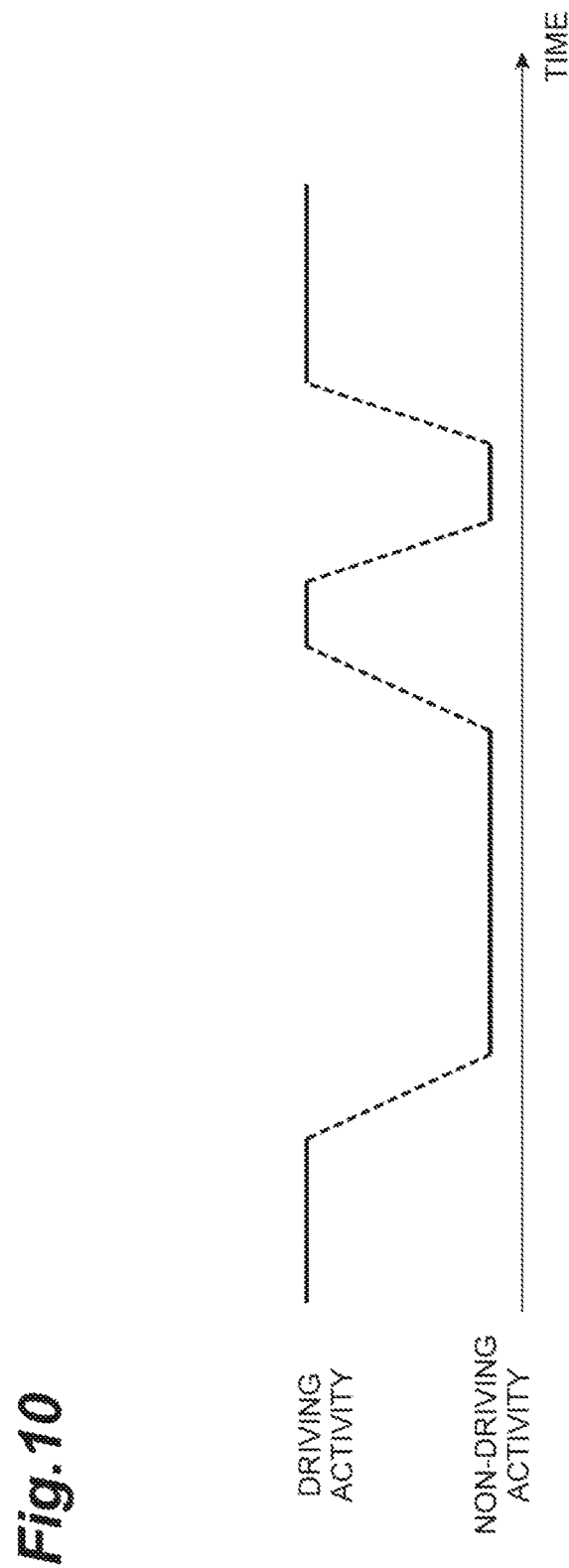
FIG. 10 is a graph illustrating the change of an activity over time between a driving activity and a non-driving activity.

In a typical method of determining whether an activity is the driving activity or the non-driving activity, for example, a threshold value is set for the likelihood of the driving activity which is calculated by a determinator, and if the likelihood is greater than or equal to a predetermined threshold value, the activity is determined as the driving activity. Similarly, a threshold value is set also for the likelihood of the non-driving activity, and if the likelihood is greater than or equal to a predetermined threshold value, the activity is determined as the non-driving activity. However, as illustrated in FIG. 10, an activity of a driver may be in an intermediate state where the likelihood is less than the threshold values for both the driving activity and the non-driving activity and the activity does not belong to both the driving activity and the non-driving activity. If the activity of the driver is determined as either the driving activity or the non-driving activity to prevent an occurrence of the intermediate state, the accuracy of determination deteriorates.

For this reason, the activity determination unit 24 of the modification example is capable of improving the accuracy of determination by excluding the intermediate state from determining whether an activity is the driving activity or the non-driving activity. The activity determination unit 24 estimates, for example, the angle of the face (face orientation) of the driver using the driver monitoring camera. If the "driving activity" is defined as when the face of the driver points to the front and the "non-driving activity" is defined as when the face points to the center display for watching movies provided in the vicinity of the center of the dashboard, the intermediate state can be defined as when the face points to somewhere between the center display and the front. In addition, in many situations, without stopping changing the face orientation in the intermediate state, the face orientation is largely changed from pointing to the center display to pointing to the front or from pointing to the front to pointing to the center display. A large change in the face orientation is defined as the activity being in the intermediate state different from the driving activity and the non-driving activity. The activity determination unit 24 determines the class of the activity from three classes including the driving activity, the non-driving activity, and the intermediate state. Therefore, the activity determination unit 24 is capable of accurately determining whether the activity is the driving activity or the non-driving activity.

In an equivalent technique, using 3-dimensional feature vectors formed of the orientation angle of the face in a horizontal direction×1, the orientation angle of the face in a vertical direction×2, and the amount of change in the face orientation×3, the class of an activity is determined from three classes including the driving activity, the non-driving activity, and the intermediate state.

Figure 11:
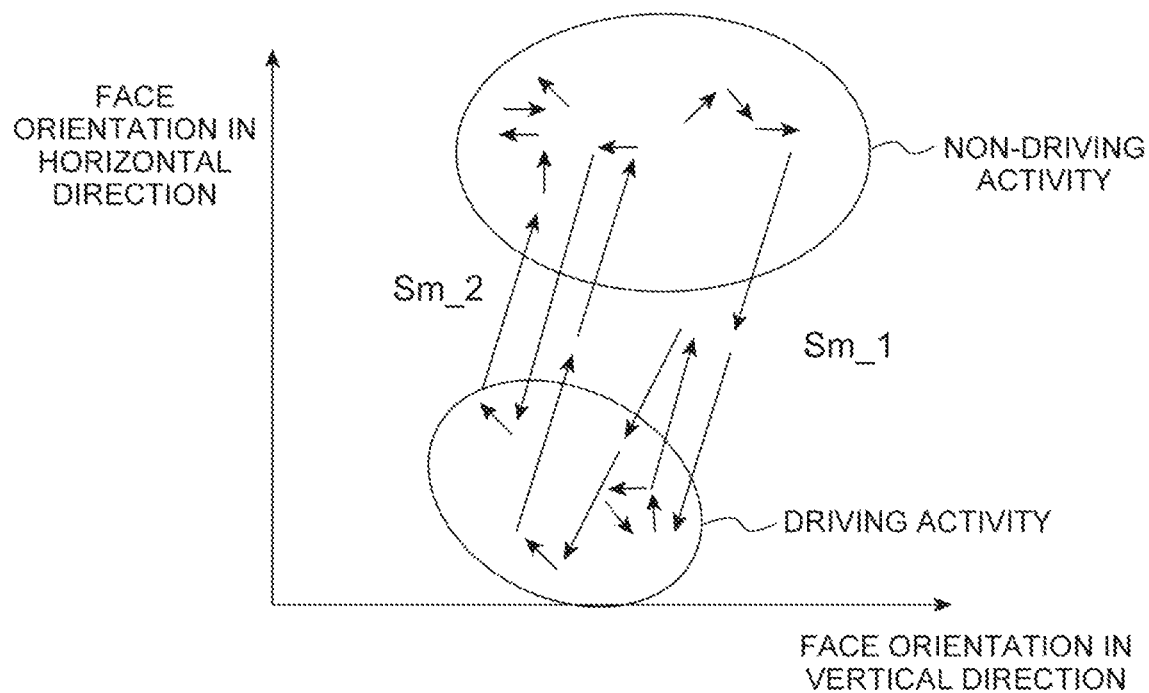
FIG. 11 is a graph for describing how an activity is determined based on a face orientation.

In addition, as illustrated in FIG. 11, for example, Sm_1 indicates an intermediate state when the face orientation is changed from pointing to the center display (non-driving activity) to pointing to the front (driving activity), and Sm_2 indicates an intermediate state when the face orientation is changed from pointing to the front to pointing to the center display. That is, the intermediate state is divided into two classes. In this case, the activity determination unit 24 determines the class of an activity from four classes including the driving activity, the non-driving activity, the intermediate state Sm_1, and the intermediate state Sm_2.

For example, if a preparation stage from the intermediate state Sm_1 to a driving state is perceived, since the driver is paying attention to the driving activity, the intermediate state Sm_1 also may be treated as the same class as the driving activity. On the contrary, since the intermediate state Sm_2 indicates that the driver starts turning attention away from the driving activity, the intermediate state Sm_2 may be treated as the same class as the non-driving activity.

The embodiments of the present disclosure have been described above; however, the present disclosure is not limited to the embodiments. The engagement level calculation unit 25 and the like of the embodiments and the modification examples calculate the engagement level based on the activity ratio which is the ratio between the time for which it is determined that the driving activity is performed and the time for which it is determined that the non-driving activity is performed. However, the engagement level calculation unit 25 and the like are not limited to using the ratio. The engagement level calculation unit 25 and the like are capable of calculating the engagement level using various methods if the methods are based on a determination result of the driving activity and a determination result of the non-driving activity. The engagement level calculation unit 25 and the like may calculate the engagement level, for example, based on a value acquired by various calculations such as adding, subtracting, and dividing the times for which it is determined that activities are performed.

In addition, the engagement level calculation unit 25 and the like may calculate the engagement level using only either the determination result of the driving activity or the determination result of the non-driving activity. In this case, the engagement level calculation unit 25 and the like may calculate the engagement level, for example, based on either the time for which it is determined that the driving activity is performed, or the time for which it is determined that the non-driving activity is performed.

In addition, the driver engagement level related to driving implies containing both of a driver engagement level related to the driving activity (engagement level for the driving activity) and a driver engagement level related to the non-driving activity (engagement level for the non-driving activity). The engagement level related to the driving activity is the level of driver engagement in the driving activity. The engagement level calculation unit 25 and the like may calculate the engagement level related to the driving activity, for example, based on the time for which it is determined that the driving activity is performed and other times in the engagement level calculation period d. On the other hand, the engagement level related to the non-driving activity is the level of driver engagement in the non-driving activity. The engagement level calculation unit 25 and the like may calculate the engagement level related to the non-driving activity, for example, based on the time for which it is determined that the non-driving activity is performed and other times in the engagement level calculation period d. The information presentation unit 28 and the like of the embodiments and the modification examples may present information based on these engagement levels.

If capable of detecting the state of the driver, sensors and the like other than the driver monitoring camera may be used as the state detection sensor 21 of the embodiments and the modification examples. For example, a contact sensor included in a steering wheel, or a proximity sensor attached to a pedal such as an accelerator pedal may be used as the state detection sensor 21. The activity determination unit 24 and the like may determine whether the driving activity or the like is performed, based on a detection result of the contact sensor or the like instead of based on images captured by the driver monitoring camera. In addition, the activity determination unit 24 and the like may determine whether the driver is in the driving state or the like, based on the detection result of the contact sensor or the like in addition to the images captured by the driver monitoring camera.

The information presentation unit 28 and the like of the embodiments and the modification examples are not limited to changing the engagement level threshold value and the switching frequency threshold value based on the system confidence level. The information presentation unit 28 and the like may change only either the engagement level threshold value or the switching frequency threshold value. In addition, the information presentation unit 28 and the like may not change the engagement level threshold value and the switching frequency threshold value based on the system confidence level.

The information presentation apparatus 200 and the like of the embodiments and the modification examples may not use the switching frequency when presenting information. That is, the information presentation apparatus 200 and the like may not include the switching frequency calculation unit 26 and the like which calculate the switching frequency.

In addition, at least parts of the embodiments and the modification examples may be randomly combined together.

What is claimed is:

1. A vehicle comprising:
   an autonomous driving system including an actuator for autonomous driving of the vehicle; and
   an information presentation apparatus comprising:
   a state detection sensor detecting a state of a driver;
   an activity determination unit configured to determine whether the driver engages in a driving activity or a non-driving activity, based on a detection result of the state detection sensor;
   an engagement level calculation unit configured to calculate a driver engagement level related to driving, based on at least one of a determination result of the driving activity and a determination result of the non-driving activity in a predetermined engagement level calculation period;
   a system confidence level acquisition unit configured to acquire a system confidence level of autonomous driving control when the autonomous driving system autonomously drives the vehicle, from the autonomous driving system;

an information presentation unit configured to present information to the driver based on the calculated engagement level and the acquired system confidence level; and a switching frequency calculation unit configured to calculate a switching frequency between the driving activity and the non-driving activity in the predetermined engagement level calculation period, based on a determination result of the activity determination unit, wherein the information presentation unit is configured to present the information based on the calculated engagement level, the acquired system confidence level, and the switching frequency.

2. The vehicle according to claim 1, wherein the engagement level calculation unit is configured to calculate the engagement level based on an activity ratio which is a ratio between a time for which it is determined that the driving activity is performed and a time for which it is determined that the non-driving activity is performed in the engagement level calculation period.

3. The vehicle according to claim 1, wherein the information presentation unit is configured to present the information based on whether the engagement level is greater than or less than a predetermined engagement level threshold value, and changes the engagement level threshold value based on the system confidence level.

4. The vehicle according to claim 1, wherein the information presentation unit is configured to present the information based on whether the switching frequency is greater than or less than a predetermined switching frequency threshold value, and to change the switching frequency threshold value based on the system confidence level.

5. The vehicle according to claim 1, wherein the activity determination unit is configured to further determine whether the non-driving activity is a first non-driving activity or a second non-driving activity different from the first non-driving activity, and wherein the engagement level calculation unit is configured to calculate the engagement level for each of the first non-driving activity and the second non-driving activity based on a first activity ratio which is a ratio between a time for which it is determined that the driving activity is performed and a time for which it is determined that the first non-driving activity is performed in the engagement level calculation period, and a second activity ratio which is a ratio between a time for which it is determined that the driving activity is performed and a time for which it is determined that the second non-driving activity is performed in the engagement level calculation period.

6. The vehicle according to claim 1, wherein the state detection sensor is one of a driver monitoring camera, a contact sensor included in a steering wheel, and a proximity sensor attached to a pedal of the vehicle.

7. The vehicle according to claim 1, wherein the actuator includes an engine actuator, a brake actuator, and a steering actuator.

* * * * *